April 11, 1939.  J. H. MILLAR  2,153,581
CENTRIFUGAL FILTER AND SEPARATOR
Original Filed June 6, 1935
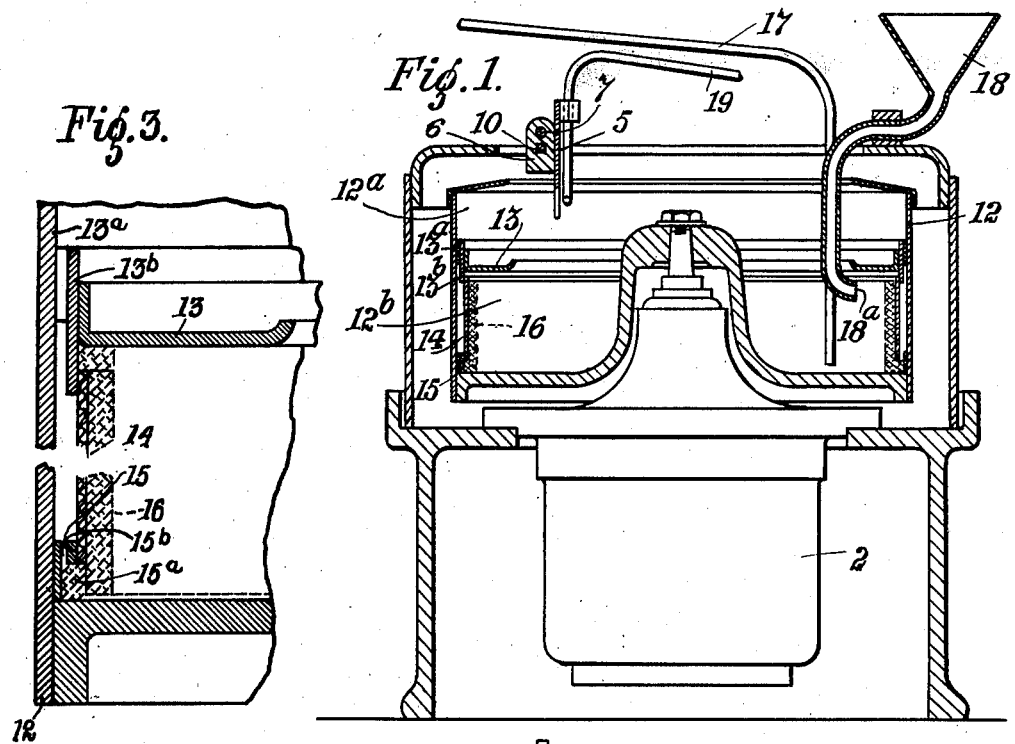
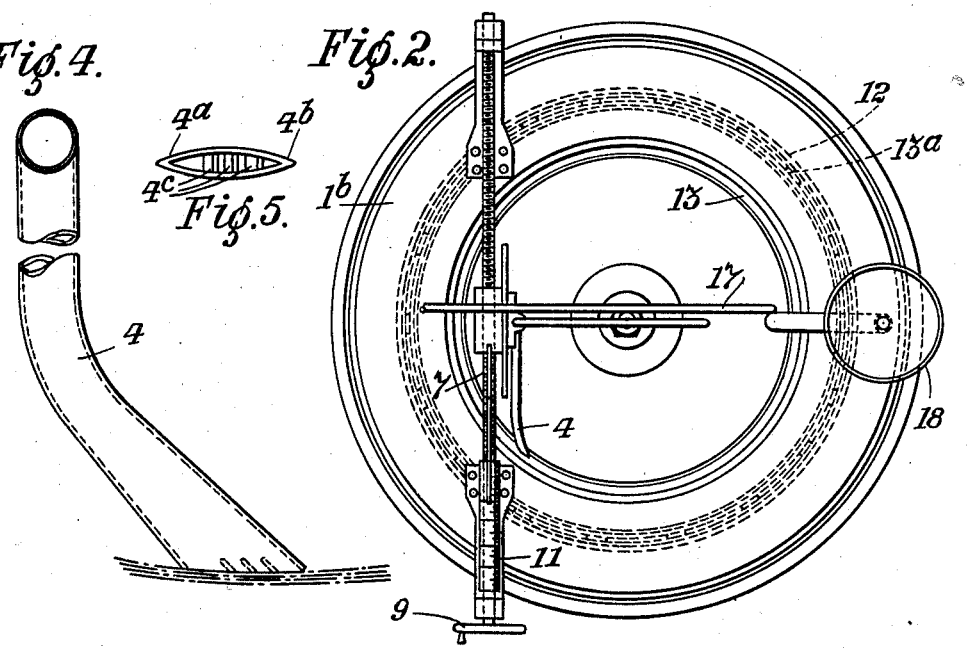
JAMES HILL MILLAR
INVENTOR
By Otto Munk
his Att'y Patented Apr. 11, 1939

2,153,581

UNITED STATES PATENT OFFICE 2,153,581

CENTRIFUGAL FILTER AND SEPARATOR

James Hill Millar, Dublin, Irish Free State, assignor to Arthur Guinness, Son and Company Limited, London, England Original application June 6, 1935, Serial No. 25,216. Divided and this application March 18, 1936, Serial No. 69,502. In Irish Free State June 22, 1934

7 Claims. (Cl. 210—63)

This invention relates to the centrifugal filtration and separation of liquids its object being to provide apparatus for this purpose.

According to this invention I provide a centrifugal filter and separator in which the centrifuge bowl comprises a charging chamber and a collection chamber, a gauze or like member separating said chambers and adapted to form a support for a filter medium or substance through which the liquid to be filtered passes under centrifugal action and means in the collection chamber for collecting the filtered liquid. More particularly the centrifugal filter and separator is characterised by a filter pulp being centrifugally applied to a gauze apron, or equivalent support, in the centrifuge, said support being carried therein in such manner as to separate the location of the filter from the location of a collector for the filtered and separated liquid, the support being so constructed and arranged in relation to its carrier and to the wall of the centrifuge bowl as to avoid uneven flow of, or short-circuiting of the liquid through the filter. The filtered liquid and (or) sludge may be collected from the centrifuge bowl by means of a collector comprising a conduit having a mouth of streamlined cross section adapted to be immersed in the spinning liquid.

The accompanying drawing shows, by way of example, centrifugal apparatus for filtering and separating liquids in accordance with this invention.

Fig. 1 is a part sectional elevation of a filtering and separating centrifuge in accordance with the invention.

Fig. 2 is a plan view corresponding to Fig. 1.

Fig. 3 is an enlarged sectional view of a portion of the filtering and separating centrifuge illustrated at Fig. 1.

Figs. 4 and 5 are respectively enlarged plan and end views of the collector blade for collecting filtered liquid and also for collecting sludge from the centrifuge.

Referring to the drawing:

The centrifuge shown at Figs. 1 to 3 has a bowl 12 rotatably mounted within a casing and adapted to be driven by a motor arranged within the casing 2. The bowl 12 is divided into two chambers or compartments, a charging chamber 12b charged through the pipe 17 and a collection chamber 12a by means of a horizontal diaphragm or plate 13 having inwardly projecting ring or plate 13 having clearance gaps (obtained by means of distance pieces 13a and constituting conduit means effecting communication between the bottom and top of the plate 13) between its outer edge and the inner surface of the bowl 12 said plate preventing the return of filtered liquid from the collection chamber 12a to the charging chamber 12b. A gauze apron 14 is provided below the said diaphragm or plate 13, with a narrow vertical passage between it and the inner surface of the bowl, which passage may be considered as part of the collection chamber 12a. The upper edge of the apron 14 is attached to and carried by a depending ring 13b on the outer edge of the plate 13. The ring 13b extends downwards a predetermined distance (approximately as shown) below the under side of the ring or plate 13.

The filter material, indicated at 16, is fed with a suitable carrier liquid, into the lower or charging chamber 12b of the bowl 12 through a hopper 18 and pipe 18a, being applied to the gauze apron 14 by centrifugal action and, preferably, the filtering material employed consists of a layer of pulp with a suitable adsorptive constituent. By varying the speed of the centrifuge and the nature and proportions of the filter pulp 16, it is possible to obtain the required filtration of liquids or semi-liquids differing in character. The greater the speed the greater is the centrifugal pressure on the pulp which is thus rendered more compact. Too high a speed will tend to block the filter medium at or near its surface, whereas the correct speed conditions are such that the adsorptive power of the medium operates throughout the greater part of the filter mass. On the other hand, a loose filter medium allows too high a speed of passage of the liquid, and imperfect separation takes place. The filter material extends from the plate 13 to the bottom of the bowl 12 and blocks the narrow gap 15 between the ring 15a and the ring 15b at the foot of the gauze. Thus the liquid is constrained to pass through the filter in passing from the charging chamber to the collection chamber and short circuiting and uneven flow are prevented and effective filtration is ensured.

When the filtered liquid, passed by centrifugal action through the filter 16, reaches the back of the gauze apron 14 it has a free passage behind same and can pass upwards past the ring or plate 13 through the aforesaid gaps or conduit means to the upper or collection chamber 12a where centrifugal separation is effected and collection of the filtered and separated liquid can be obtained by means of a collector 4. When the filtered and separated extract has been drawn off, the sludge remaining in the centrifuge can, while the centrifuge is running, be removed by means of a similar collector of larger dimensions. The collector 4 comprises a hollow flat blade with sharpened leading and trailing edges 4b, 4a. It has been found that this shape reduces splashing to a minimum, the entrance to the collector being submerged in the liquid while collecting to prevent inclusion of air and formation of froth and being provided with inclined collecting vanes 4c. The collector 4 is shown at Fig. 2 controlled by screw control gear consisting of a screw 7, a bracket or carrying member 6 which engages the screw 7 and an operating wheel 9. The scale 11 is provided to regulate movement of the collector 4 so that its collecting mouth may be kept submerged in the liquid to the desired extent.

The plate 13 being located at the top of the bowl 12 ensures that the collection chamber 12a is located above the level of the liquid in the charging chamber and hence gives rise to a gravitational head of liquid opposing the centrifugal force which forces the filtered liquid up the passage. This, together with the narrowness of the vertical passage ensures that the filtered liquid remains coherent and there is no aeration and consequent frothing.

The centrifugal apparatus described will give sharp separation of an extract from insoluble matter following efficient filtration, as described in my co-pending application No. 25,216 filed on June 6, 1935, of which this application is a division, and is particularly adapted for use in the process described therein.

I claim:

1. A centrifugal filter and separator for use in the manufacture of food extract from brewer's yeast, comprising a centrifuge bowl, driving means therefor and collecting means for the filtered liquid, said bowl comprising a container, an internally projecting annular plate thereon in spaced relationship to the wall of said container, a cylindrical gauze member depending from said plate in spaced relationship to the said wall, and a filter pulp of asbestos and cellulose supported on said gauze, and said collecting means comprising a conduit located above said plate and having a mouth of elongated cross section with sharp leading and trailing edges adapted to be immersed in the spinning filtered liquid with the major axis lying substantially in the direction of movement of the liquid.

2. A centrifugal filter and separator for use in the manufacture of food extract from brewer's yeast, comprising a centrifuge bowl, driving means therefor and collecting means for the filtered liquid, said bowl comprising a container, an internally projecting annular plate thereon in spaced relationship with regard to the container wall, a ring depending from said plate in spaced relationship to the said wall, a cylindrical gauze member depending from said ring in spaced relationship to said wall and a filter pulp of asbestos and cellulose on the inner side of said gauze, and said collecting means comprising a conduit located above said plate and having a mouth of elongated cross section with sharp leading and trailing edges adapted to be immersed in the spinning filtered liquid with its major axis substantially parallel to the direction of movement of the liquid.

3. A centrifugal filter and separator for use in the manufacture of food extract from brewer's yeast, comprising a centrifuge bowl, consisting of a charging chamber and a collection chamber, driving means for said bowl and collecting means for the filtered liquid, an internally projecting annular plate on said bowl in spaced relationship to the inner wall thereof, a ring depending from said plate in spaced relationship to the said wall, a cylindrical gauze member depending from said ring in similar relationship to said wall and a filter pulp of asbestos and cellulose on said gauze, and said collecting means comprising a conduit located above said plate and having a mouth of flattened cross section with sharp leading and trailing edges, said mouth being adapted to be immersed in the spinning filtered liquid which passes through said gauze and up the space between same and the said inner wall to the collection chamber above said plate, and means for adjusting the degree of immersion of the said mouth in the said liquid.

4. A centrifugal filter and separator for use in the manufacture of food extract from brewer's yeast, comprising a centrifuge bowl, driving means therefor and collecting means for the filtered liquid, said bowl comprising a container, an internally projecting annular plate thereon in spaced relationship with regard to the container wall, a ring depending from said plate in spaced relationship to the said wall, a cylindrical gauze member depending from said ring in similar relationship to said wall and a filter pulp of asbestos and cellulose supported on the inner side of said gauze, and said collecting means comprising a conduit located above said plate and having a mouth of elongated cross section with sharp leading and trailing edges adapted to be immersed wholly in the spinning filtered liquid, the major axis of the cross section lying in the direction of movement of the liquid which passes through said gauze and up the space between same and the container wall to above said plate, screw means for adjusting the position of said conduit and means for indicating the degree of adjustment.

5. A centrifugal filter and separator including a centrifuge bowl and collecting means for the filtered liquid, said bowl comprising a container and a gauze member supported in spaced relationship to the wall of said container and adapted to support a filter pulp, and said collecting means comprising a conduit located above the space between said wall and the gauze member and having a mouth of elongated cross section with sharp leading and trailing edges adapted to be immersed in the spinning filtered liquid with the major axis lying substantially in the direction of movement of the liquid.

6. A centrifugal filter and separator comprising a centrifuge bowl, driving means therefor and collecting means for the filtered liquid, said bowl comprising a container, an internally projecting annular plate thereon in spaced relationship to the wall of the container, a finely apertured member depending from said plate in closely spaced relationship to the wall of the container, a filter medium supported on said member, said collecting means being located above said plate and comprising a conduit terminating in a part of flattened cross section with a collecting mouth of similar cross section having a major axis, said mouth having vanes therein lying transversely of the major axis and so inclined that they form an obtuse angle with the surface of the approaching liquid.

7. A centrifugal filter and separator including a centrifuge bowl with division means dividing it into a lower charging and an upper collection chamber, driving means therefor and collecting means in the collection chamber for the filtered liquid, said division means comprising an internally projecting annular member supported on the inner wall of the container, conduit means adjacent the said wall and effecting communication between the bottom and top of said member, a gauze member supported from said member in closely spaced relationship to the container wall to form a narrow vertical passage communicating with said conduit means, a filter pulp supported on said gauze and extending from the underside of said internally projecting member downwards into contact with imperforate means at the foot of the gauze, said imperforate means and said annular member preventing liquid passing from the charging chamber to the collection chamber without passing through the gauze, up the narrow vertical passage and through said conduit means in the annular member into the collection chamber.

JAMES HILL MILLAR.